US012789402B2

(12) United States Patent
Go et al.

(10) Patent No.: US 12,789,402 B2
(45) Date of Patent: Nov. 10, 2026

(54) RAZOR ASSEMBLY

(71) Applicant: DORCO CO., LTD., Yongin-si (KR)

(72) Inventors: Woo Gyeong Go, Seoul (KR); Dong Il Kim, Seoul (KR); Yong Geon Kim, Seoul (KR); Kyong Sik Lee, Seoul (KR)

(73) Assignee: Dorco Co., Ltd., Seoul (KR)

( * ) Notice: Subject to any disclaimer, the term of this patent is extended or adjusted under 35 U.S.C. 154(b) by 146 days.

(21) Appl. No.: 18/504,884

(22) Filed: Nov. 8, 2023

(65) Prior Publication Data

US 2024/0083055 A1 Mar. 14, 2024

Related U.S. Application Data

(63) Continuation of application No. PCT/KR2022/005947, filed on Apr. 26, 2022.

(30) Foreign Application Priority Data

May 11, 2021 (KR) ........................ 10-2021-0060532

(51) Int. Cl.
*B26B 21/52* (2006.01)
*B26B 21/22* (2006.01)

(52) U.S. Cl.
CPC .......... *B26B 21/521* (2013.01); *B26B 21/225* (2013.01)

(58) Field of Classification Search
CPC . B26B 21/40; B26B 21/4012; B26B 21/4062; B26B 21/225; B26B 21/521; B26B 21/22; B26B 21/52

(Continued)

(56) References Cited

U.S. PATENT DOCUMENTS

2005/0000100 A1 1/2005 Coffin
2010/0043242 A1 2/2010 Stevens
(Continued)

FOREIGN PATENT DOCUMENTS

JP H06-032066 Y2 8/1994
KR 10-2011-0040940 A 4/2011
(Continued)

OTHER PUBLICATIONS

International Search Report and Written Opinion mailed Aug. 12, 2022 in International Application No. PCT/KR2022/005947.
(Continued)

*Primary Examiner* — Boyer D Ashley
*Assistant Examiner* — Robert D Cornett
(74) *Attorney, Agent, or Firm* — Knobbe, Martens, Olson & Bear, LLP

(57) ABSTRACT

A razor assembly is proposed. The razor assembly may include a blade housing configured to receive at least one or more shaving blades in a longitudinal direction. The razor assembly may also include a connector disposed on the rear side of the blade housing and a spin housing coupled to the connector. The razor assembly may further include a fixing housing coupled to the spin housing and configured to render the spin housing to be rotatable about a first rotational axis perpendicular to the longitudinal direction. The razor assembly may further include a first restoring force-providing unit configured to provide a restoring force for restoring the spin housing to a first rest position when the spin housing is rotated about the first rotational axis relative to the fixing housing.

12 Claims, 10 Drawing Sheets

(58) Field of Classification Search
USPC .... 30/50, 51, 57, 58, 66, 67, 526, 527, 530, 30/531, 532, 533
See application file for complete search history.

(56) References Cited

U.S. PATENT DOCUMENTS

| | | | | |
|---|---|---|---|---|
| 2012/0260509 | A1 | 10/2012 | Fang et al. | |
| 2015/0283716 | A1 | 10/2015 | Kim et al. | |
| 2018/0272549 | A1* | 9/2018 | Son | B26B 21/08 |
| 2019/0152077 | A1* | 5/2019 | Kim | B26B 21/521 |

FOREIGN PATENT DOCUMENTS

| | | | |
|---|---|---|---|
| KR | 10-2014-0050220 | A | 4/2014 |
| KR | 10-1743128 | B1 | 6/2017 |
| KR | 10-1887119 | B1 | 8/2018 |

OTHER PUBLICATIONS

Office Action dated Sep. 22, 2023 in Korean Application No. 10-2021-0060532.

* cited by examiner

RAZOR ASSEMBLY

CROSS-REFERENCE TO RELATED APPLICATIONS

This is a continuation application of International Patent Application No. PCT/KR2022/005947, filed on Apr. 26, 2022, which claims priority to Korean Patent Application No. 10-2021-0060532 filed on May 11, 2021, the disclosure of each of which is incorporated by reference herein in its entirety.

BACKGROUND

Technical Field

The present disclosure in some embodiments relates to a razor assembly.

Description of Related Technology

The statements in this section merely provide background information related to the present disclosure and do not necessarily constitute prior art.

Commonly known as a wet razor, a razor assembly includes a razor cartridge and a razor handle.

SUMMARY

One aspect is a razor cartridge and razor assembly having multiple rotational axes, configured to provide restoring force during pivoting, and capable of conforming to the user's skin curvatures.

Another aspect is a razor assembly including a blade housing configured to receive at least one or more shaving blades in a longitudinal direction, a connector disposed on the rear side of the blade housing, a spin housing coupled to the connector, a fixing housing coupled to the spin housing and configured to render the spin housing to be rotatable about a first rotational axis perpendicular to the longitudinal direction, and a first restoring force-providing unit configured to provide a restoring force for restoring the spin housing to a first rest position when the spin housing is rotated about the first rotational axis relative to the fixing housing.

As described above, the present disclosure in some embodiments can provide a razor cartridge and razor assembly with multiple rotational axes and a configuration for providing restoring force when pivoting to conform to the curvature of the user's skin.

DETAILED DESCRIPTION

Figure 1:
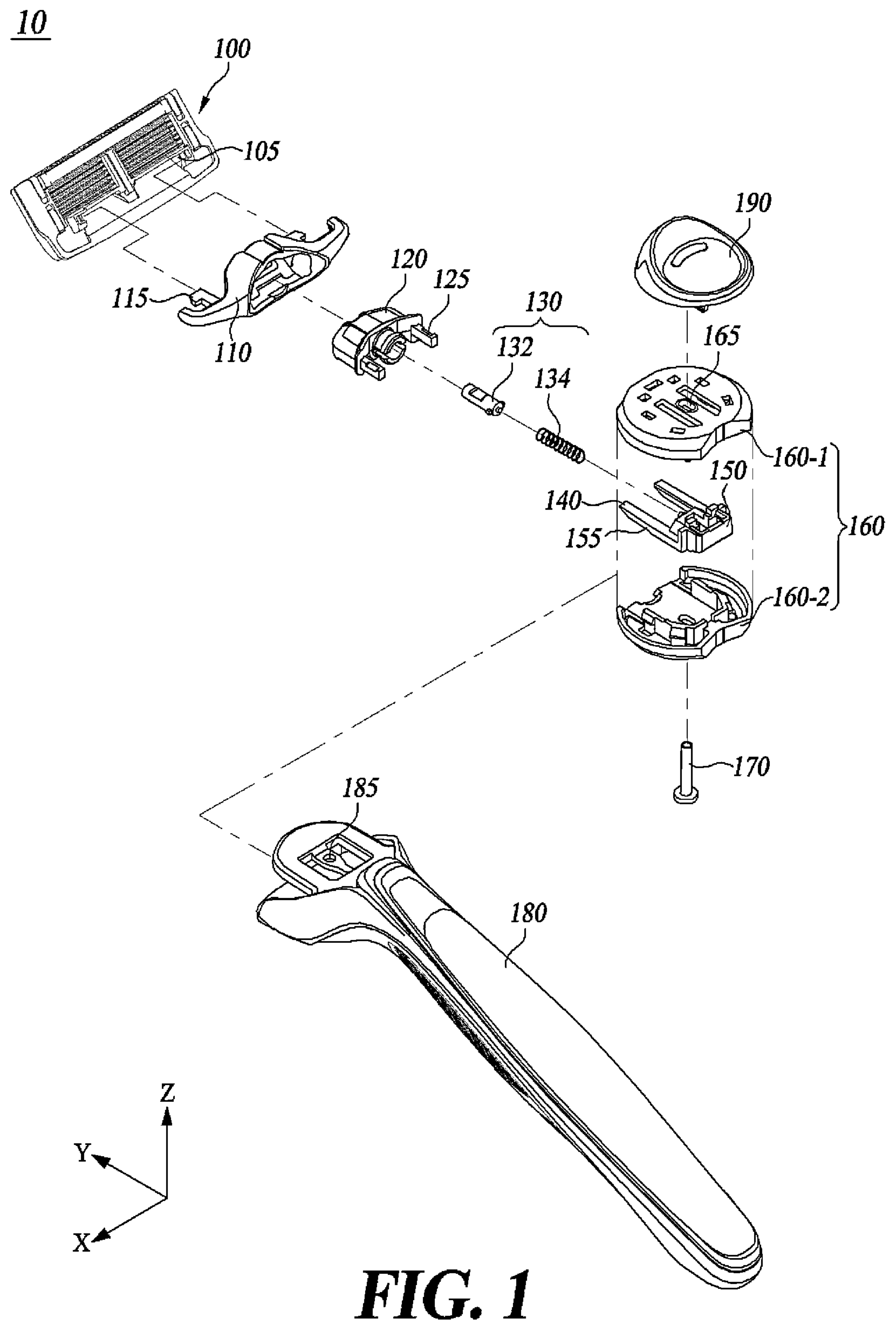
FIG. 1 is an exploded rear view of a razor assembly according to a first embodiment of the present disclosure.

The razor cartridge is configured to be pivotable about the razor handle between a rest position and pivoting positions away from the rest position. The razor cartridge makes a pivoting motion fundamentally about a rotational axis parallel to the alignment direction of shaving blades.

The pivoting motion of the razor cartridge about the rotational axis parallel to an alignment direction of the shaving blades helps to ensure that the shaving blades make good contact with the user's skin, thereby facilitating an efficient shave.

To implement the pivoting motion of the razor cartridge, conventional razor cartridges use a rotary connecting method or a fixed connecting method. In the rotary connecting method, the connector is configured to be fixed in position against the razor handle and rotatable about a rotational axis relative to the razor cartridge. In the fixed connecting method, the connector is configured to be fixed in position against the razor cartridge and rotatable about a rotational axis relative to the razor handle.

However, both the rotary connecting method and the fixed connecting method are configured to allow pivoting about a rotational axis parallel to the alignment direction of the shaving blades, but not, for example, pivoting about a rotational axis perpendicular to the alignment direction of the shaving blades.

To ensure that the shaving can proceed across varying skin curvatures with the shaving blades maintaining close contact with the skin, there is a need for a razor cartridge capable of pivoting about various rotational axes.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

Additionally, various ordinal numbers or alpha codes such as first, second, i), ii), a), b), etc., may be prefixed. These numbers and codes are solely used to differentiate one component from the other but not to imply or suggest the substances, order, or sequence of the components. Throughout this specification, when a part "includes" or "comprises" a component, the part is meant to further include other components, not to exclude thereof unless specifically stated to the contrary.

FIG. 1 is an exploded rear view of a razor assembly according to a first embodiment of the present disclosure.

Figure 2:
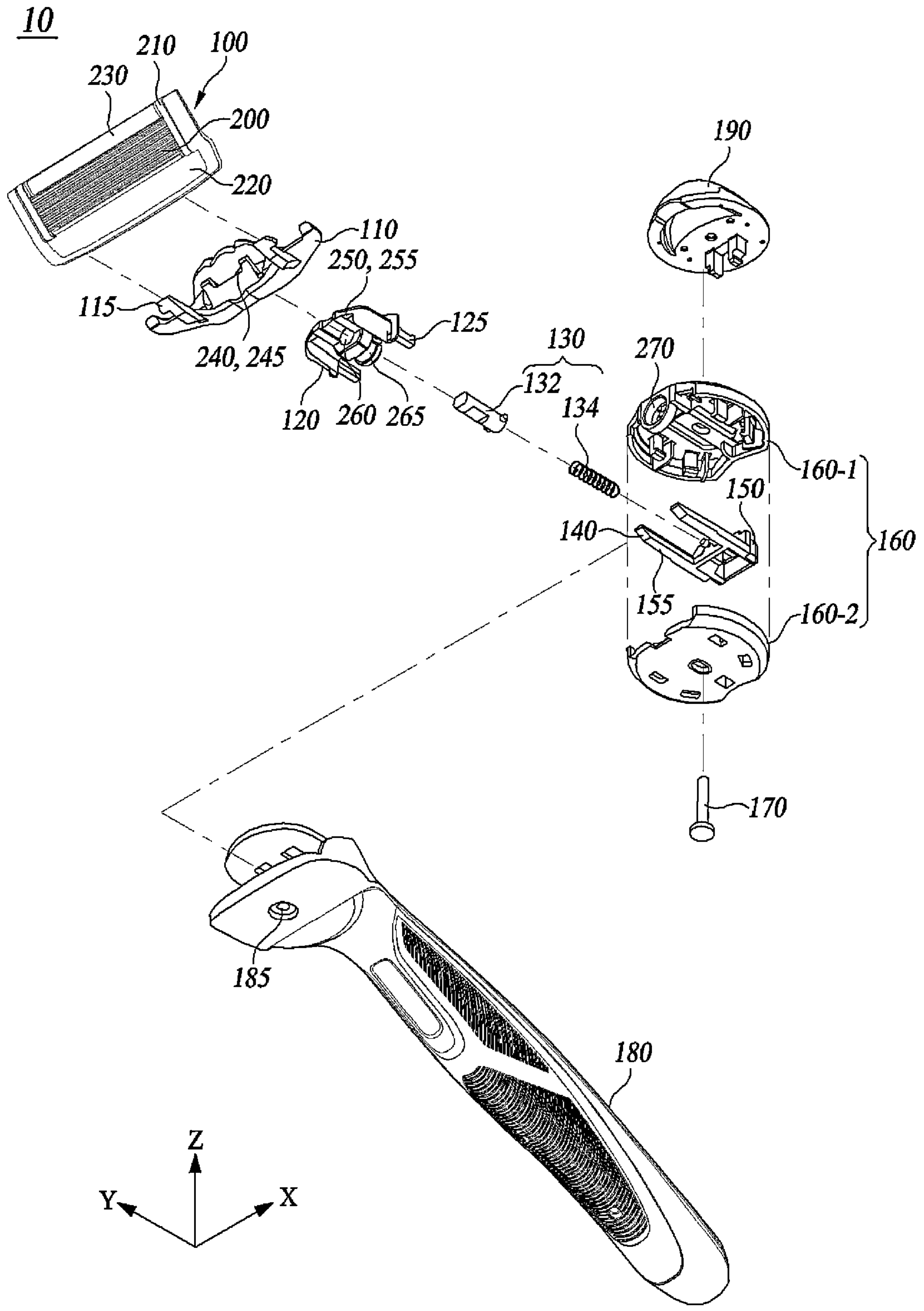
FIG. 2 is an exploded front perspective view of some components of the razor assembly according to the first embodiment of the present disclosure.

FIG. 2 is an exploded front perspective view of some components of the razor assembly according to the first embodiment of the present disclosure.

Figure 3:
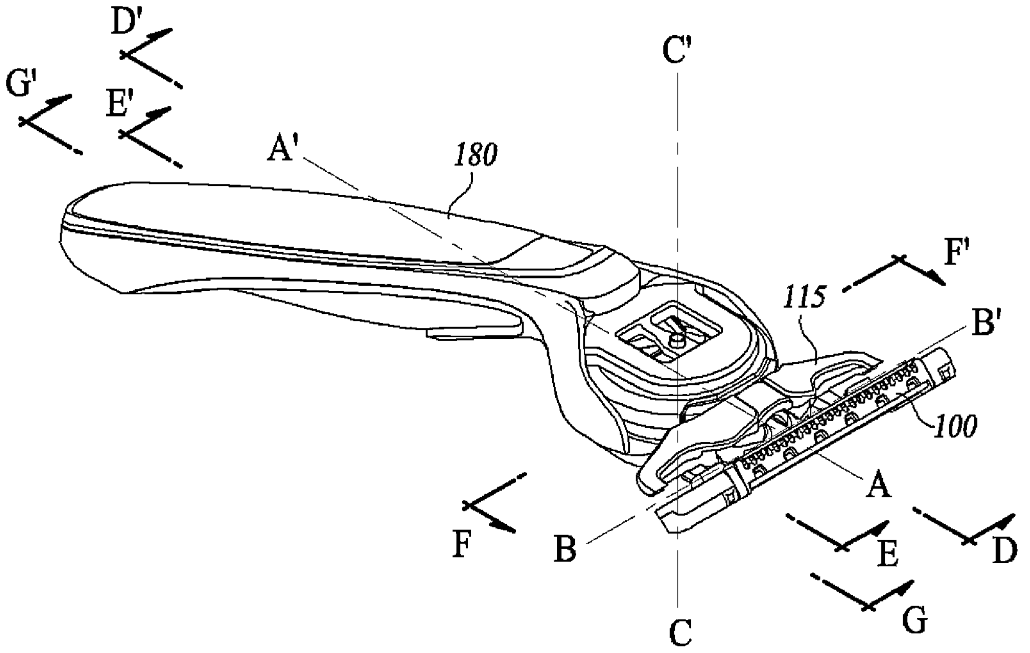
FIG. 3 is an assembly perspective view of a razor assembly according to at least one embodiment of the present disclosure.

FIG. 3 is an assembly perspective view of a razor assembly according to at least one embodiment of the present disclosure.

Referring to FIGS. 1 to 3, a razor assembly 10 according to a first embodiment of the present disclosure includes all or part of a blade housing 100, a connector 110, a spin housing 120, a fixing housing 160, a first restoring force-providing unit 140, an ejecting unit 150, a razor handle 180, and a button unit 190.

The blade housing 100 receives at least one or more shaving blades 200 in a longitudinal direction. As used herein, the longitudinal direction refers to the direction in which the shaving blade 200 extends, for example, in FIG. 1, the longitudinal direction is parallel to the X-axis. The shaving blade 200 has a cutting edge extending longitudinally and may include at least one, i.e., one or a plurality of cutting edges.

At least one shaving blade 200 may be retained while received on one side of the blade housing 100 by a fixture, such as by a plurality of clips, 210.

Additionally, the blade housing 100 may include a guard 220 and a cap 230. As described herein, the front side may be the side of the blade housing 100 toward which the cutting edge of the shaving blade 200 faces, and the rear side may be the side of the blade housing 100 that faces away from the front side.

On the front side of the blade housing 100, the guard 220 may be positioned forward of the shaving blade 200, and the cap 230 may be positioned rearward of the shaving blade 200. Herein, the forward and rearward of the shaving blades 200 are defined relative to a shaving direction. However, as used herein, forward and rearward for components other than the shaving blades 200 refer to a positive y-axis direction and a negative y-axis direction in FIG. 1, respectively.

The guard 220 can stretch the skin in the shaving direction before cutting the body hair with the shaving blade 200 during shaving. The user's body hair may be held upright by the guard 220 in a direction perpendicular to the user's skin surface, thereby allowing the shaving blade 200 to more easily cut the body hair.

The cap 230 may be configured to include a lubrication material, which may serve to protect the user's skin during shaving.

The connector 110 is disposed on the rear side of the blade housing 100. The connector 110 may be manufactured as a separate member from the blade housing 100 and then disposed on the rear side of the blade housing 100. However, the present disclosure is not necessarily limited to this configuration, and the connector 110 and the blade housing 100 may be manufactured as a single unit.

The spin housing 120 is interconnected with the connector 110. The direction in which the spin housing 120 is engaged with or disengaged from the connector 110 may be defined as an attachment direction which is a transverse direction perpendicular to the longitudinal direction and is parallel to some of the extension direction of the razor handle 180. For example, the attachment direction may be the positive Y-axis direction or negative Y-axis direction in FIG. 1, in which case the positive Y-axis direction may be the engagement direction and the negative Y-axis direction may be the disengagement direction.

Referring to FIG. 2, for coupling the spin housing 120 and the connector 110, the connector 110 may include a first connecting portion 240, and the spin housing 120 may include a second connecting portion 250.

In this case, the first connecting portion 240 may include at least one cantilever 245 extending from one end of the connector 110. There may be at least one, or a plurality of, cantilevers 245. The cantilever 245 may extend from the connector 110 in a direction toward where the blade housing 100 is located or forwardly, but is not necessarily limited to such a design.

The second connecting portion 250 includes at least one hooked protrusion 255 configured for hook coupling with one end of the cantilever 245. There may be at least one, or a plurality of, hooked protrusions 255 which are preferably configured to be equal to the number of cantilevers 245.

The fixing housing 160 is coupled to the spin housing 120 such that the spin housing 120 is rotatable about a first rotational axis perpendicular to the longitudinal direction. In particular, once coupled to the fixing housing 160, the spin housing 120 is rotatable about the first rotational axis relative to the fixing housing 160. Herein, the first rotation axis may be a direction parallel to the Y-axis in FIG. 1, such as a direction parallel to the attachment direction, and more specifically, it may mean the A-A' direction in FIG. 3.

However, the razor assembly 10 according to the first embodiment of the present disclosure does not necessarily include the separate fixing housing 160 shown in FIG. 1. For example, the fixing housing 160 may be formed integral with the razor handle 180, or may be a part incorporated into the razor handle 180.

The spin housing 120 is rotatable about the first rotational axis relative to the fixing housing 160, so the connector 110 coupled to the spin housing 120 is also rotatable about the first rotational axis, which in turn allows the blade housing 100 to be rotatable about the first rotational axis.

The fixing housing 160 may be configured to include an upper fixing housing 160_1 and a lower fixing housing 160_2, as shown in FIG. 1. In this case, the spin housing 120 may be coupled between the upper fixing housing 160_1 and the lower fixing housing 160_2, such that the spin housing 120 is coupled to the upper fixing housing 160_1 and the lower fixing housing 160_2 is coupled to a bottom portion of the upper fixing housing 160_1. However, the present disclosure is not necessarily limited to this configuration.

The first restoring force-providing unit 140 is configured to provide restoring force to restore the spin housing 120 to a first rest position when the spin housing 120 is rotated about the first rotation axis relative to the fixing housing 160. Herein, the first rest position refers to the position of the spin housing 120 before rotation about the first rotational axis.

For example, the first restoring force-providing unit 140 may be configured to elastically deform by contacting at least a portion of the connector 110 as the spin housing 120 rotates about the first rotational axis. Additionally, the first restoring force-providing unit 140 may be contained within the fixing housing 160, but this is not mandatory and at least a portion of the first restoring force-providing unit 140 may be contained within the fixing housing 160.

With the razor assembly 10 according to the first embodiment of the present disclosure, the spin housing 120 is rotatable about the first rotational axis relative to the fixing housing 160, and when, after the spin housing 120 rotates, a rotational torque about the first rotational axis is no longer acting on the spin housing 120, the first restoring force-providing unit 140 may provide a restoring force to the spin housing 120 to return the spin housing 120 to the first rest position.

The ejecting unit 150 is configured to eject the spin housing 120 from the connector 110. For example, when the ejecting unit 150 is moved in the engagement direction, it may elastically deform the cantilevers 245, which will cause the cantilevers 245 to disengage from the hooked protrusions 255. In this case, the ejecting unit 150 may include at least one or more push bars 155 for elastically deforming the cantilevers 245.

The razor handle 180 is connected to the fixing housing 160 and serves as the part that the user grips for shaving.

The button unit 190 is coupled to the razor handle 180 and is a portion that is operated by the user to move the ejecting unit 150. Thus, the button unit 190 is configured to be movable in conjunction with the ejecting unit 150, and the user can easily disengage the spin housing 120 and the connector 110 by moving the button unit 190 in the engagement direction.

Figure 4A:
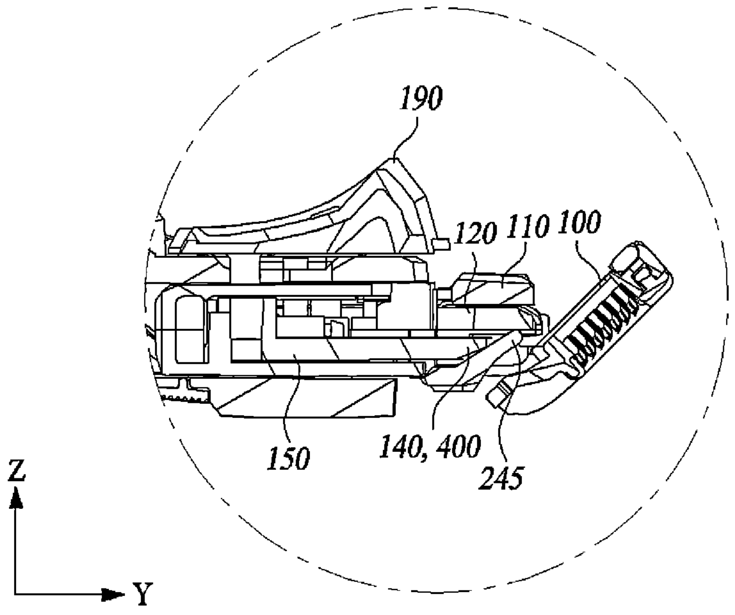
FIGS. 4A and 4B are side cross-sectional views of the razor assembly according to the first embodiment of the present disclosure, cut respectively in the D-D' direction and E-E' direction of FIG. 3.
Figure 4B:
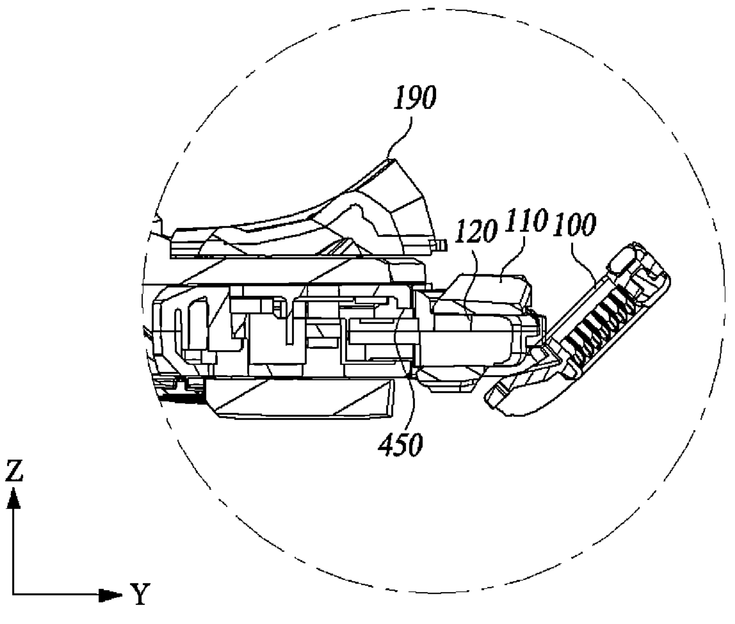

FIGS. 4A and 4B are side cross-sectional views of the razor assembly according to the first embodiment of the present disclosure, cut respectively in the D-D' direction and E-E' direction of FIG. 3.

Figure 5:
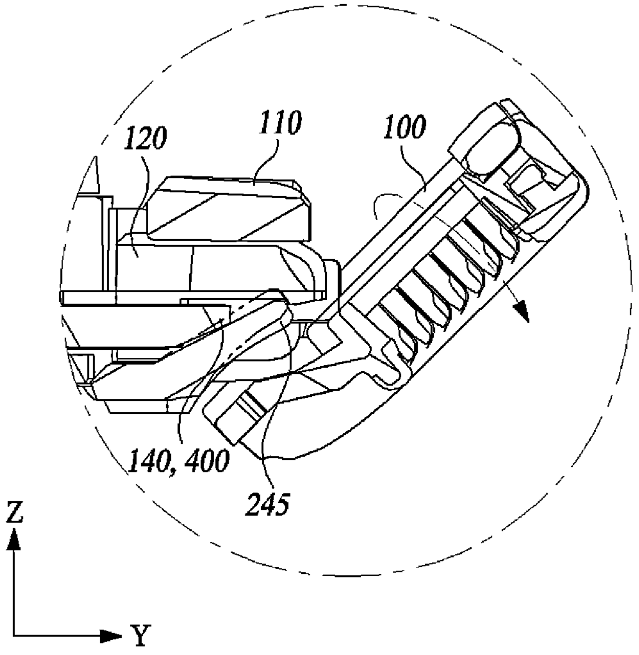
FIG. 5 illustrates a first restoring force-providing unit of FIG. 4A providing restoring force.

FIG. 5 illustrates the first restoring force-providing unit of FIG. 4A providing restoring force.

Referring to FIGS. 4A and 5, the first restoring force-providing unit 140 may include at least one arm 400 that abuts at least a portion of the cantilever 245. For example, at least one arm 400 may be located at a forward end of the first restoring force-providing unit 140.

In this case, the arm 400 may be configured to be elastically deformed by being pressed by the cantilever 245 when the spin housing 120 rotates about the first rotational axis. Thus, the arm 400 may provide restoring force to the spin housing 120 when a rotational torque about the first rotational axis is no longer acting on the spin housing 120.

Meanwhile, the first restoring force-providing unit 140 may include at least a portion of the ejecting unit 150. For example, if the ejecting unit 150 includes push bars 155, the arms 400 may be configured to include at least a portion of the push bars 155. In this case, the ejecting unit 150 may be a component not only for disengaging the spin housing 120 from the connector 110 but may also be a component for restoring the spin housing 120 to the first rest position.

In this case, the first restoring force-providing unit 140 may be configured integral with the push bars 155, and a configuration is also possible in which the first restoring force-providing unit 140, the push bar 155, and the ejecting unit 150 are all integral.

However, the first restoring force-providing unit 140 does not necessarily include at least a portion of the ejecting unit 150, and as long as the first restoring force-providing unit 140 can provide restoring force to the spin housing 120, the first restoring force-providing unit 140 may be made separately from the ejecting unit 150.

Referring to FIGS. 1 and 4B, the spin housing 120 may include at least one or more restoring ribs 125 extending rearwardly from one side of the spin housing 120. Further, the fixing housing 160 may include a stop surface 450 that faces at least a portion of the restoring ribs 125. Preferably, a plurality of restoring ribs 125 may be provided for structural stability, which is not mandatory and a single restoring rib 125 may also be provided.

When the spin housing 120 is rotated about the first rotational axis, if the range of rotation is not limited, the cantilever 245 may become excessively deformed elastically and separated from the hooked protrusion 255. To prevent this, the spin housing 120 may be configured such that its stop surface 450 abuts at least a portion of the restoring rib 125, thereby limiting the spin housing 120 from rotating about the first rotational axis.

Accordingly, at the maximum angle of rotation of the spin housing 120 about the first rotational axis relative to the fixing housing 160, at least a portion of the restoring rib 125 will be in contact with the stop surface 450. The angle of rotation of the spin housing 120 about the first rotational axis may be limited to within 10° on either side and preferably within 6°.

Figure 6:
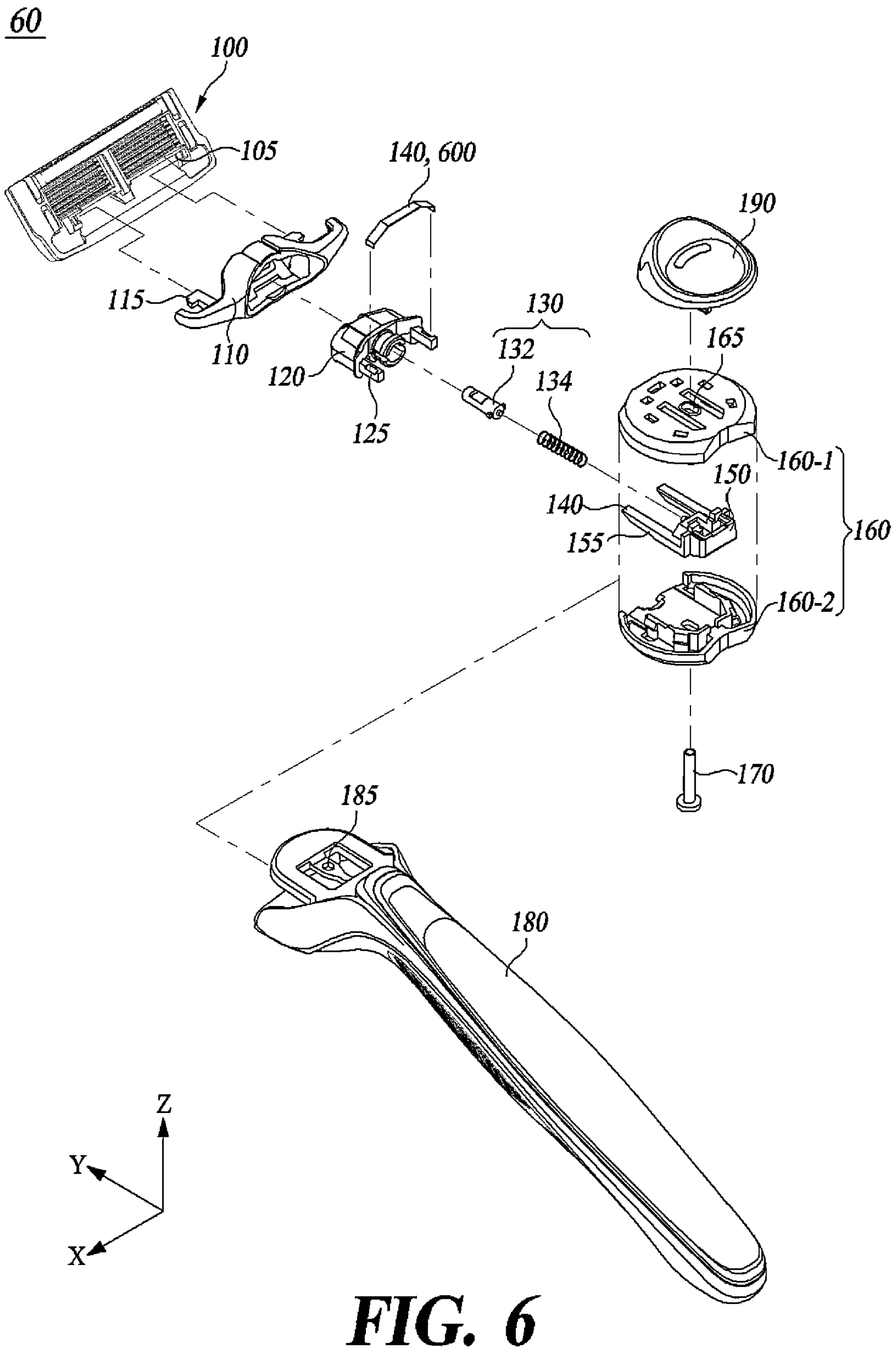
FIG. 6 is an exploded rear view of a razor assembly according to a second embodiment of the present disclosure.

FIG. 6 is an exploded rear view of a razor assembly according to a second embodiment of the present disclosure.

Figure 7A:
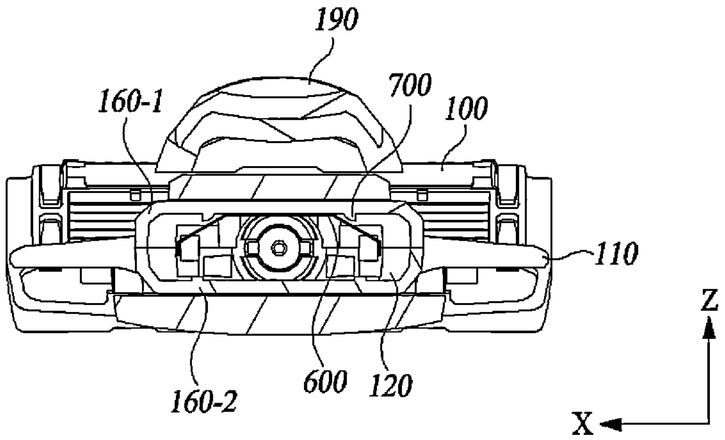
FIGS. 7A through 7C are rear cross-sectional views of the razor assembly according to the second embodiment of the present disclosure, cut in the direction F-F' of FIG. 3.
Figure 7B:
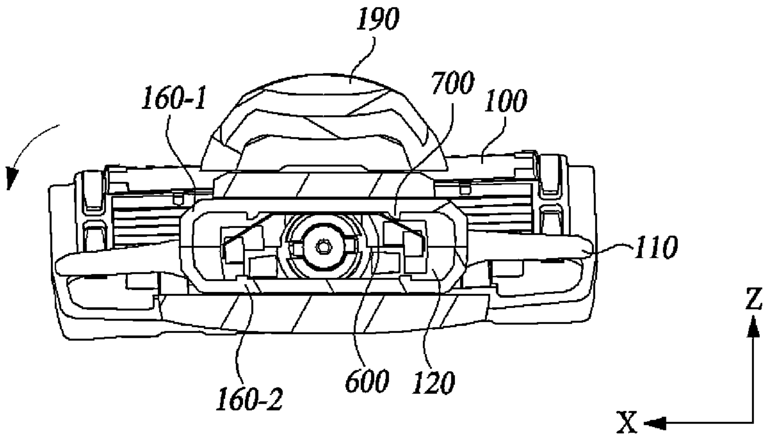
Figure 7C:
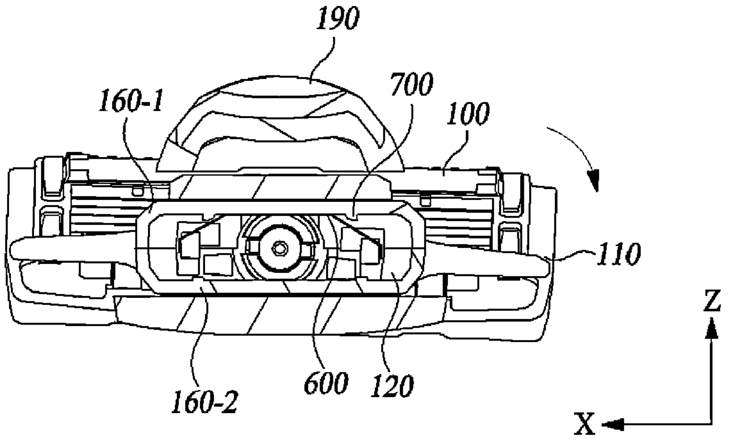

FIGS. 7A through 7C are rear cross-sectional views of the razor assembly according to the second embodiment of the present disclosure, cut in the direction F-F of FIG. 3.

The second embodiment illustrates a razor assembly 60 of the present disclosure, which may be identical to the configuration of the razor assembly 10 according to the first embodiment, and therefore a detailed description thereof is omitted except for the configuration specifically described below.

Referring to FIGS. 6 and 7A through 7C, the first restoring force-providing unit 140 of the razor assembly 60 according to the second embodiment may include a plate spring 600. The plate spring 600 is disposed between the spin housing 120 and the fixing housing 160. In response to the spin housing 120 rotating about the first rotational axis, the plate spring 600 may be elastically deformed, thereby providing a restoring force to the spin housing 120.

The plate spring 600 may be configured to contact a portion of the spin housing 120, and preferably both ends of the plate spring 600 may be configured to contact lateral portions of the spin housing 120. For example, where the spin housing 120 includes a plurality of restoring ribs 125, the plate spring 600 may be configured to abut at least one side of each of the restoring ribs 125. In this case, at least a portion of the plurality of restoring ribs 125 may be pressed by at least a portion of the plate spring 600, thereby providing restoring force to the spin housing 120.

On the other hand, to limit the extent to which the spin housing 120 can be rotated, the fixing housing 160 according to the second embodiment may include stop protrusions 700. The stop protrusions 700 may be configured to protrude from one side of the fixing housing 160 and may limit the range of rotation of the spin housing 120 by limiting the extent to which the plate spring 600 is elastically deformed. Additionally, when the fixing housing 160 includes the stop protrusions 700, it may still include such features as the stop face 450.

As with the razor assembly 10 according to the first embodiment, the razor assembly 60 according to the second embodiment may include the above constructions for allowing the spin housing 120 to be rotatable about the first rotational axis. After the spin housing 120 rotates, the first restoring force-providing unit 140 may provide a restoring force to the spin housing 120 to return the spin housing 120 to the first rest position. Further, the angle at which the spin housing 120 rotates about the first rotation axis may be limited to within 6° on either side.

Figure 8A:
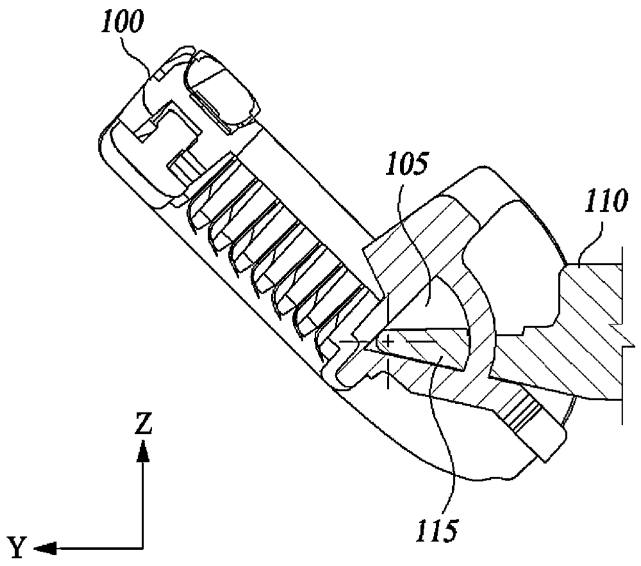
FIGS. 8A and 8B are side cross-sectional views of a razor assembly according to at least one embodiment of the present disclosure, cut in the G-G' direction of FIG. 3.
Figure 8B:
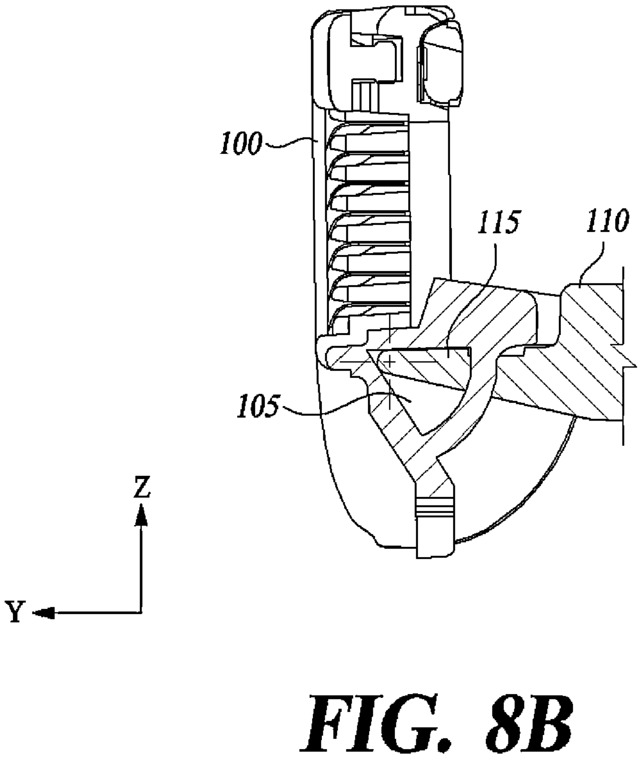

FIGS. 8A and 8B are side cross-sectional views of a razor assembly according to at least one embodiment of the present disclosure, cut in the direction G-G' of FIG. 3.

Figure 9:
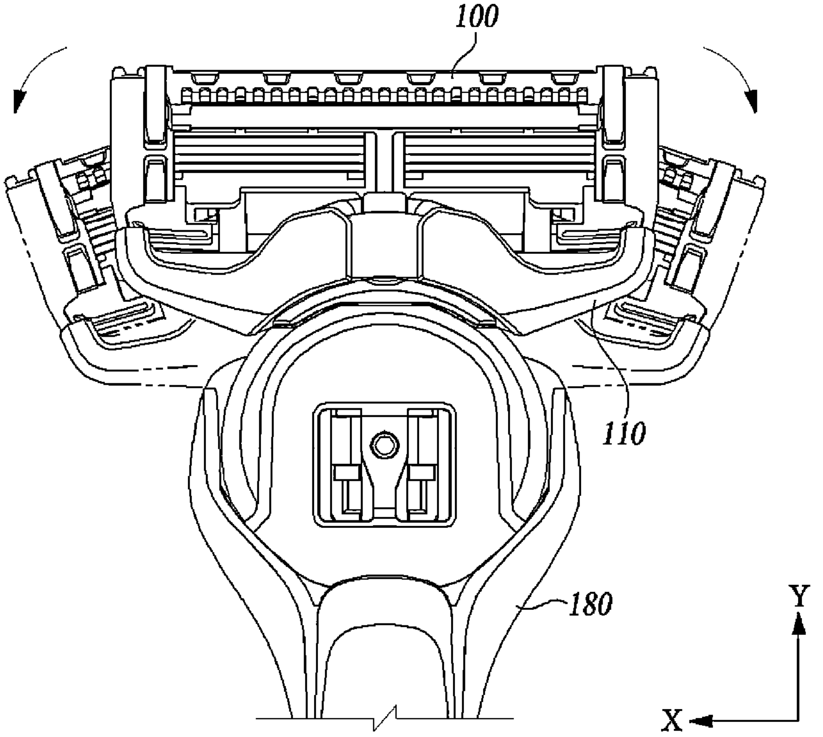
FIG. 9 is a rear view of a razor assembly pivoting about a third rotational axis, according to at least one embodiment of the present disclosure.

FIG. 9 is a rear view of a razor assembly pivoting about a third rotational axis, according to at least one embodiment of the present disclosure.

Referring to FIGS. 3, 8A, and 8B, the razor assemblies 10 and 60 according to embodiments of the present disclosure may be configured to enable the blade housing 100 to pivot relative to the connector 110 about a second rotational axis parallel to the longitudinal direction. In this case, the blade housing 100 and the connector 110 are interconnected to allow the blade housing 100 to pivot relative to the connector 110 about the second rotational axis. Herein, the second rotational axis may be disposed within a region of the blade housing 100 and may refer to, for example, the B-B' direction in FIG. 3.

Meanwhile, referring to FIGS. 1 and 6, to implement pivoting about the second rotational axis, the blade housing 100 may include one or more coupling holes 105 formed on the rear side of the blade housing 100, and the connector 110 may include one or more coupling projections 115 that connect to the one or more coupling holes 105.

Referring to FIGS. 1 and 6, the razor assemblies 10 and 60 according to embodiments of the present disclosure may further include a second restoring force-providing unit 130. The second restoring force-providing unit 130 is configured to provide a restoring force to restore the blade housing 100 to a second rest position when the blade housing 100 pivots about the second rotational axis. Herein, the second rest position refers to the position of the blade housing 100 before pivoting about the second rotational axis.

After the blade housing 100 has pivoted about the second rotational axis relative to the connector 110, when the rotational torque about the second rotational axis is no longer acting on the blade housing 100, the second restoring force-providing unit 130 may provide a restoring force to the blade housing 100 to return the same to the second rest position.

The second restoring force-providing unit 130 may be configured to penetrate the spin housing 120 or to penetrate both the spin housing 120 and the fixing housing 160. To this end, the spin housing 120 and the fixing housing 160 may include a first through-hole 260 and a second through-hole 270, respectively.

In this case, the first through-hole 260 may include an extension unit 265 for coupling with the fixing housing 160 or the second through-hole 270. The extension unit 265 may be configured to extend from the spin housing 120 in a direction parallel to the first rotational axis. Further, the direction of extension of the extension unit 265 may be parallel to the direction of extension of the restoring ribs 125.

However, the extension unit 265 is not necessarily included in the first through-hole 260 and may be configured to be included in the fixing housing 160 or the second through-hole 270. In this case, the extension unit 265 may be still configured to extend from the fixing housing 160 in a direction parallel to the first rotational axis, and the direction of extension of the extension unit 265 may be parallel to the direction of extension of the restoring ribs 125.

By having the first through-hole 260 and the second through-hole 270 configured as above, the spin housing 120 may rotate about the first rotational axis relative to the fixing housing 160, and the first rotational axis may pass through the center of the first through-hole 260 of the spin housing 120 or the center of a plunger 132 to be described below.

The second restoring force-providing unit 130 may include the plunger 132 and an elastic member 134. In this case, the plunger 132 is configured to perform cam action with the blade housing 100 to transmit a restoring force, and the elastic member 134 is configured to provide an elastic force to the plunger 132.

For example, in response to the blade housing 100 pivoting about the second rotational axis, the plunger 132 may be configured to move in the direction of the Y-axis of FIGS. 1 and 6. Further, the elastic member 134 may be configured to contract when the plunger 132 moves in the negative Y-axis direction, in which case the elastic member 134 may provide positive Y-axis restoring force to the plunger 132. However, the second restoring force-providing unit 130 of the razor assemblies 10 and 60 according to embodiments of the present disclosure do not necessarily utilize the plunger 132 and elastic member 134 to provide restoring force.

The razor assemblies 10 and 60 according to embodiments of the present disclosure may provide rotation and pivoting of the razor cartridge about the first rotation axis and the second rotation axis, thereby improving shaving performance even on curved skin.

On the other hand, by having one end of the elastic member 134 connected to the rear end of the plunger 132 and the other end of the elastic member 134 connected to the ejecting unit 150, the elastic member 134 may provide restoring force to the ejecting unit 150 when the ejecting unit 150 moves in the engagement direction. Accordingly, the ejecting unit 150 may be returned to its original position after being moved in the engagement direction to disconnect the spin housing 120 and the connector 110.

Referring to FIGS. 3 and 9, the razor assemblies 10 and 60 according to embodiments of the present disclosure may be configured such that the fixing housing 160 is pivotable relative to the razor handle 180 about a third rotational axis perpendicular to the longitudinal and attachment directions. Herein, the third rotational axis may be perpendicular to the first and second rotational axes, may be perpendicular to at least some of the extension of the razor handle 180, and may be perpendicular to the longitudinal direction. For example, the third rotational axis may be in the direction C-C' in FIG. 3.

Referring to FIGS. 1 and 6, to implement pivoting about the third rotational axis, the fixing housing 160 may include a third through-hole 165, the razor handle 180 may include a fourth through-hole 185, and the fixing housing 160 may include a shaft 170 threaded through the third through-hole 165 and the fourth through-hole 185. In this case, the center axes of the third through-hole 165 and the fourth through-hole 185 preferably coincide with the third rotational axis.

By having the fixing housing 160 and the razor handle 180 include the third through-hole 165 and the fourth through-hole 185, respectively, using the shaft 170 to interconnect them, the fixing housing 160 may be pivotable about the third rotational axis relative to the razor handle 180.

By enabling the razor cartridge to rotate and pivot about the first rotational axis, second rotational axis, and third rotational axis, the razor assemblies 10 and 60 according to embodiments of the present disclosure can improve shaving performance even on curved skin.

While not shown, the present disclosure may further include a third restoring force-providing unit (not shown) that provides a restoring force to restore the fixing housing 160 to a third rest position when the fixing housing 160 pivots about the third rotational axis. Herein, the third rest position refers to a position of the fixing housing 160 before pivoting about the third rotational axis.

After the fixing housing 160 has rotated about the third rotational axis relative to the razor handle 180, if the rotational torque about the third rotational axis is no longer acting on the fixing housing 160, the third restoring force-providing unit may provide a restoring force to the fixing housing 160, thereby returning the same to the third rest position.

As described above, the razor assemblies 10 and 60 according to embodiments of the present disclosure may have diverse axes of rotation and may be configured to provide restoring force during rotation and pivoting, thereby providing improved razor conformity to the curvatures of the user's skin.

Although exemplary embodiments of the present disclosure have been described for illustrative purposes, those skilled in the art will appreciate that various modifications, additions, and substitutions are possible, without departing from the defining features by the embodiments. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A razor assembly, comprising:

a blade housing configured to receive at least one or more shaving blades in a longitudinal direction;

a connector disposed on a rear side of the blade housing and comprising a first connecting portion;

a spin housing detachably coupled to the connector;

the spin housing comprising a second connecting portion formed at a first side thereof facing the connector, the spin housing configured to be coupled to the connector by engaging the second connecting portion with the first connecting portion of the connector, the spin housing configured to be decoupled from the connector by disengaging the second connecting portion from the first connecting portion of the connector, the spin housing being rotatable about a first rotational axis perpendicular to the longitudinal direction to rotate the blade housing and the connector about the first rotational axis, and the spin housing further comprising an extension unit formed at a second side thereof opposing the first side, the extension unit extending rearward along the first rotational axis;

an ejecting unit configured to separate the spin housing from the connector;

a fixing housing coupled to the spin housing and configured to receive the extension unit of the spin housing so as to render the spin housing to be rotatable about the first rotational axis; and a first restoring force-providing unit configured to provide a restoring force for restoring the spin housing to a first rest position in response to the spin housing being rotated about the first rotational axis relative to the fixing housing, wherein the blade housing is rotatable relative to the connector about a second rotational axis parallel to the longitudinal direction, wherein the fixing housing is fixed with respect to the first rotational axis, wherein the spin housing is configured to be rotatable about the first rotational axis relative to the fixing housing, wherein, when the spin housing is rotated about the first rotational axis relative to the fixing housing, the first restoring force-providing unit contacts a portion of the connector and is elastically deformed to provide a restoring force, and wherein the first restoring force-providing unit and the ejecting unit are formed integrally.

2. The razor assembly of claim 1, wherein the first connecting portion of the connector comprises at least one or more cantilevers extending from one side of the connector, and wherein the second connecting portion of the spin housing comprises at least one or more hooked protrusions configured to make a hook coupling with one end of each of the cantilevers.

3. The razor assembly of claim 1, wherein the connector comprises at least one or more cantilevers extending from one side of the connector, wherein the first restoring force-providing unit comprises at least one or more arms abutting at least a portion of each of the one or more cantilevers, and wherein the one or more arms are configured to be elastically deformed by being pressed by the one or more cantilevers when the spin housing is rotated about the first rotational axis.

4. The razor assembly of claim 1, further comprising:

a plate spring disposed between the spin housing and the fixing housing.

5. The razor assembly of claim 4, wherein the spin housing comprises at least one restoring rib extending rearwardly from one side of the spin housing, and wherein at least a portion of the at least one restoring rib is configured to be pressed by at least a portion of the plate spring so that the plate spring provides the restoring force to the spin housing.

6. The razor assembly of claim 1, wherein the spin housing comprises at least one restoring rib extending rearwardly from one side of the spin housing, wherein the fixing housing comprises a stop surface facing at least a portion of the at least one restoring rib, and wherein at least a portion of the at least one restoring rib is in contact with the stop surface so that the spin housing is limited from being rotated about the first rotational axis.

7. The razor assembly of claim 1, wherein the blade housing and the connector are configured to enable the blade housing to pivot relative to the connector about a second rotational axis parallel to the longitudinal direction.

8. The razor assembly of claim 7, further comprising:

a second restoring force-providing unit configured to provide a restoring force for restoring the blade housing to a second rest position in response to the blade housing rotating about the second rotational axis.

9. The razor assembly of claim 8, wherein the second restoring force-providing unit comprises:

a plunger configured to transmit a restoring force by cam action with the blade housing; and an elastic member configured to provide an elastic force to the plunger.

10. The razor assembly of claim 1, wherein the connector comprises an opening configured to accommodate an exterior portion of a body of the spin housing, and wherein the ejecting unit is configured to separate the spin housing from the connector by ejecting the exterior portion of the body of the spin housing from the opening of the connector by disengaging the second connecting portion of the spin housing from the first connecting portion of the connector.

11. The razor assembly of claim 1, wherein the fixing housing comprises an upper fixing housing and a lower fixing housing, and wherein at least part of the spin housing is disposed between the upper fixing housing and the lower fixing housing.

12. The razor assembly of claim 1, wherein the first restoring force-providing unit comprises at least one arm configured to provide the restoring force after a rotational torque about the first rotational axis is no longer applied to the spin housing, following elastic deformation of the arm during rotation of the spin housing.

* * * * *